(No Model.)
T. O. TOWNSEND.
ARTIFICIAL JAMESTOWN BLOOM.
No. 243,816.
Patented July 5, 1881.
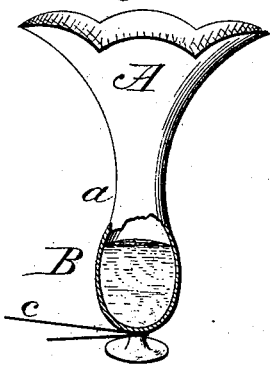
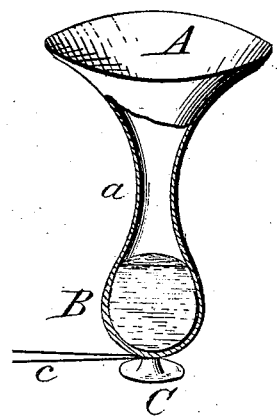
Witnesses:
F. H. Schott.
N. R. Brown.
Tighlman O. Townsend
Inventor
C. H. Watson & Co
Per
Attorneys.
N. PETERS, Photo-Lithographer, Washington, D. C.

UNITED STATES PATENT OFFICE.

TIGHLMAN O. TOWNSEND, OF FRANKLIN, KENTUCKY.

ARTIFICIAL JAMESTOWN-BLOOM.

SPECIFICATION forming part of Letters Patent No. 243,816, dated July 5, 1881.

Application filed November 16, 1880. (No model.)

*To all whom it may concern:*

Be it known that I, TIGHLMAN O. TOWNSEND, of Franklin, in the county of Simpson and State of Kentucky, have invented certain new and useful Improvements in Artificial Jamestown-Blooms; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to devices for exterminating the tobacco-fly and other harmful insects belonging to the same family; and it consists of an artificial flower having a poison-cup at the bottom and a contraction in the center to exclude honey-bees, as hereinafter more fully described and claimed.

In the annexed drawings, Figures 1 and 2 show perspective views of my improved flower, partly in section.

A represents the flower, which may be made of glass, porcelain, or other material in any appropriate form, and suitably colored to more perfectly imitate the desired bloom. The flower is, however, preferably made round or cylindrical, gradually contracted from each end toward its center a, and is provided with a cup-cavity or enlarged chamber, B, at the bottom for the reception of a poisoned liquid. It also has a neck or stem, C, and may be attached by means of the wire c in any desired position.

The poisonous preparation used in this artificial bloom is the same as that heretofore used for a similar purpose, and is made in the proportion of one pint of water to one gill of molasses, honey, or sugar and one-half ounce to one ounce of cobalt.

The size of the bloom should depend upon the size and kind of insect to be destroyed.

The tobacco-fly feeds by means of a long trunk about the size of a knitting-needle, which enables it to reach the poisonous mixture in the chamber B without difficulty, even when the flower is of large size, while the cabbage-moth is much smaller, and could not reach the bottom of the long blossom.

This bloom will destroy the hawk-moth, tobacco-fly, or any moth belonging to that family, or that feeds in the same way by means of a long trunk, and is greatly superior to the natural bloom, as it can be used during a whole season.

I am aware that artificial Jamestown-blooms have been prepared with filaments and stamens composed of a poisonous mixture, for the extermination of the tobacco-fly, as shown in patent to W. B. Wood, No. 229,222, dated June 22, 1880; but this I do not claim. As heretofore made, such flowers are also liable to entrap and destroy honey-bees and other harmless insects for which they are not intended.

By making the flower or bloom of a round or cylindrical form, as shown in the drawings, it presents a more natural appearance, is also more durable or less likely to become broken, and, having a central contracted portion, effectually prevents the entrance of the honey-bee. The poisonous mixture, being contained in a chamber at the bottom of the bloom, is also more readily extracted by the tobacco-fly than if it were formed into stamens, as heretofore employed.

Having thus fully described my invention, what I claim as new, and desire to secure by Letters Patent, is—

1. An artificial bloom having a contracted central portion to exclude the honey-bee, and an enlarged cup-shaped cavity at the bottom to contain a poisonous mixture for exterminating the tobacco-fly, substantially as specified.

2. The artificial bloom or flower A, having a contracted central portion, a, cup-shaped cavity or chamber B, stem C, and attaching-wire c, substantially as and for the purpose described.

In testimony that I claim the foregoing as my own I have hereto affixed my signature in presence of two witnesses.

TIGHLMAN O. TOWNSEND.

Witnesses:
LEWIS C. GARRIGUS,
A. M. LYLES.